United States Patent [19]
Horne et al.

[11] Patent Number: 5,515,377
[45] Date of Patent: May 7, 1996

[54] ADAPTIVE VIDEO ENCODER FOR TWO-LAYER ENCODING OF VIDEO SIGNALS ON ATM (ASYNCHRONOUS TRANSFER MODE) NETWORKS

[75] Inventors: Caspar Horne, Beaverton, Oreg.; Amy R. Reibman, East Windsor, N.J.

[73] Assignee: AT&T Corp., Murray Hill, N.J.

[21] Appl. No.: 113,788

[22] Filed: Sep. 2, 1993

[51] Int. Cl.[6] .................................................. H04J 3/16
[52] U.S. Cl. ............................................. 370/94.1; 370/79
[58] Field of Search ........................ 370/94.1, 60, 85.6, 370/110.1, 79; 340/825.5, 825.51, 825.52, 825.06; 348/415, 409

[56] References Cited

U.S. PATENT DOCUMENTS

| | | | |
|---|---|---|---|
| 5,029,164 | 7/1991 | Goldstein et al. | 370/79 |
| 5,140,417 | 8/1992 | Tanaka et al. | 370/85.6 |
| 5,249,185 | 9/1993 | Kanno et al. | 370/60 |
| 5,267,232 | 11/1993 | Katsube et al. | 370/85.6 |
| 5,282,203 | 1/1994 | Oouchi | 370/94.1 |
| 5,315,591 | 5/1994 | Brent et al. | 370/85.6 |

OTHER PUBLICATIONS

International Standarisation Organization Committee Draft 11172–2, "Coding Of Moving Pictures And Associated Audio For Digital Storage Media At Up To About 1.5 Mbit/s–Part 2 Video," Nov. 25, 1991, pp. $2 \geq 46$, Appendices A–D.

"Selective Recovery of Video Packet Loss Using Error Concealment", M. Wada, *IEEE Journal on Selected Areas in Communications*, vol. 7, No. 5, Jun. 1989, pp. 807–814.

"Joint Source/Channel Coding of Statistically Multiplexed Real–Time Services On Packet Networks", Mark W. Garrett et al., *IEEE/ACM Transactions On Networking*, vol. 1, No. 1, Feb. 1993, pp. 71–80.

Telecommunication Standardization Sector, Study Group 15, Experts Group for ATM Video Coding, Document AVC–491b, Version 2, Apr. 1993 ISO–IEC/JTC1/SC29/WG11, "Coded Representation of Picture and Audio Information", pp. 1–119.

*Primary Examiner*—Douglas W. Olms
*Assistant Examiner*—Dang Ton
*Attorney, Agent, or Firm*—Mark K. Young; Thomas Stafford

[57] ABSTRACT

The quality of video images received at the remote end of an ATM network capable of transmitting data at high and low priorities is greatly improved at high cell loss levels by employing a two-layered video encoding technique that adapts the method for encoding information transmitted in the low-priority bit-stream to the rate of cell loss on the network so that compression efficiency and image quality are high when the network load is low and resiliency to cell loss is high when the network load is high. The encoder adapts its encoding method in response to a cell loss information signal generated by the remote decoder by selecting the prediction mode used to encode the low-priority bit-stream, and by changing the frequency at which slice-start synchronization codes are placed within the low-priority bit-stream.

24 Claims, 3 Drawing Sheets

ADAPTIVE VIDEO ENCODER FOR TWO-LAYER ENCODING OF VIDEO SIGNALS ON ATM (ASYNCHRONOUS TRANSFER MODE) NETWORKS

TECHNICAL FIELD

This invention relates to video image processing, and more particularly, to adapting video encoding parameters to ATM network load conditions for limiting the effect of lost cells on video quality.

BACKGROUND OF THE INVENTION

The asynchronous transfer mode (ATM) environment is now widely recognized as the preferred way of implementing Broadband Integrated Services Digital Network (B-ISDN) multiservice networks for simultaneously carrying voice, data, and video on the network. ATM networks transmit an encoded video signal in short, fixed-size cells of information using statistical multiplexing.

An ATM network can transmit data using multiple priorities because it allows the terminal to mark each cell as either high or low-priority. If congestion develops, the ATM network drops low-priority cells before high-priority cells are dropped. Video can be encoded to take advantage of multiple priorities by partitioning the video image into more and less important parts. The more important part, known as the base layer, typically includes enough basic video information for the decoder to reconstruct a minimally acceptable image, and is transmitted by the ATM network in the high-priority bit-stream. The less important part, known as the enhancement layer, is used to enhance the quality of the image, and is transmitted in the low-priority bit-stream. The partitioning of video data into high and low priorities is described in detail in the Motion Picture Experts Group Phase 2 Test Model 5 Draft Version 2, Doc. MPEG93/225, April 1993 (MPEG-2 TM5). Such methods include spatial sealability, frequency sealability, signal-to-noise ratio (SNR) sealability, and data partitioning.

One problem with ATM networks is that each network source is allocated less bandwidth than its peak requirement which results in a nonzero probability that cells will be lost or delayed during transmission. Such probability of loss or delay increases as the load on the network increases. In addition, cells may be effectively lost as random bit errors are introduced into the cell header during transmission. A lost or delayed cell has the potential to significantly affect the image quality of the received video signal because real-time video cannot wait for retransmission of errored cells. Lost cells in a given frame cause errors in decoding which can propagate into subsequent frames, or into a larger spatial area. An encoding method that provides for high video image quality at the remote end, even when there are cell losses on the network, is said to be resilient to cell loss. Cell loss resiliency, however, is less significant when there are no cell losses on the network, such as when the network load is low. Thus, it is desirable to encode video with good compression efficiency when network load is low, but with good resiliency to cell loss when network traffic becomes congested.

Prior an video encoding systems with resiliency to cell loss using the high and low priority transmission capabilities of ATM include adaptive encoders that dynamically modify encoding in response to information fed back to the encoder from the remote end. For example, one prior art system adjusts the partition between data encoded into high and low-priorities in response to cell loss, while using a fixed encoding algorithm, to improve the efficiency of statistical multiplexing. This prior art system is not entirely satisfactory because it requires that all sources on the ATM network adapt using the same partitioning scheme which complicates the call admission (i.e. connection) process. This results because the network needs to ascertain that a source will implement the adaptation prior to making the admission.

Another prior art system provides resiliency to cell loss by decoding the received signal to determine the number and addresses of the blocks contained in lost cells at the remote end. Then this determination is relayed to the encoder which calculates the affected picture area in the locally decoded image to allow encoding from the point of the errored blocks up to the currently encoded frame without using the errored area. This system requires that the decoder completely decode and process the transmitted bit-stream before any feedback can be relayed to the encoder. While this system provides for a measure of compression efficiency at low network loads, as the network load increases the feedback delay inherent in such a system can potentially defeat any advantage gained from adaptive encoding when the delay exceeds the real-time encoding requirements of the encoder.

SUMMARY OF THE INVENTION

The quality of video images received at the remote end of an ATM network with high and low-priority transmission capability is greatly improved at high cell loss levels, in accordance with the principles of the invention, by employing a two-layered video encoding technique that adapts the algorithm used for encoding information transmitted in the low-priority bit-stream to the level of cell loss on the network so that compression efficiency and image quality are high when the network load is low and resiliency to cell loss is high when the network load is high.

Specifically, the encoder encodes the prediction error blocks of the enhancement layer using either spatial or temporal prediction, or a combination of both spatial and temporal prediction, in response to a cell loss information signal indicative of the level of cell losses on the ATM network. This cell loss information signal is transmitted to the encoder from the remote decoder. In the no or low cell loss situation, to encode the current block, the encoder selects either temporal or spatial prediction, depending on which will produce the best compression efficiency. However, as the average level of cell loss over a predetermined number of frames increases, the encoder uses spatial prediction more often to prevent any decoding error resulting from cell loss from propagating into subsequent frames. If the cell loss level subsequently decreases, the encoder selects the best prediction as before.

The encoder also adapts its encoding method in response to the cell loss information signal by changing the frequency of slice-start synchronization codes inserted in the low-priority bit-stream. The encoder inserts more frequent slice-start synchronization codes as the level of cell loss increases on the ATM network to allow the decoder to recover more rapidly from losses.

The invention provides a number of technical advantages in addition to improved video quality at high levels of cell loss. For example, the call admission process is simplified; the feedback delay to the encoder is minimized allowing for more rapid adaptation to changing network loading conditions; the encoder adapts to the average network characteristics rather than to individual cell losses to improve adaptation response; and compression efficiency is high when the network is lightly loaded.

BRIEF DESCRIPTION OF THE DRAWING

In the drawing.

Shown in FIG. 1, in simplified block diagram form, is an illustrative encoder unit and decoder unit embodying aspects of the invention, and an ATM with high and low priority transmission capability.

DETAILED DESCRIPTION

Figure 1:
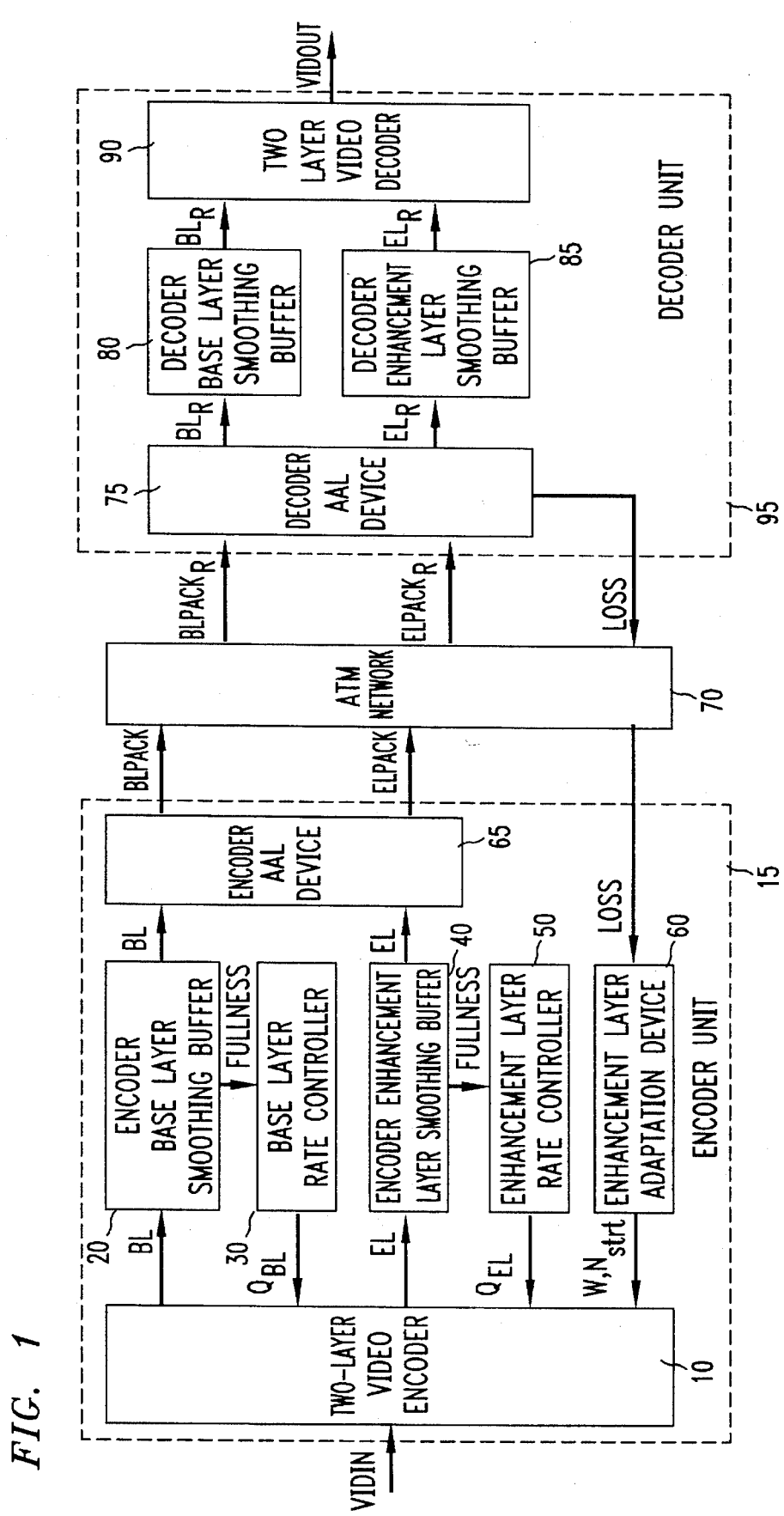

FIG. 1 is a simplified block diagram of encoder unit 15, decoder unit 95, and ATM network 70 with high and low-priority transmission capability, incorporating the principles of the invention. In overall view, an original video signal, VIDIN, including frames, is supplied as an input to two-layer video encoder 10 in encoder unit 15. Such video signals are well known in the art. Two-layer video encoder 10 partitions and encodes the video signal into two bit-streams. One bit-stream includes the encoded base layer and the other includes the encoded enhancement layer. These bit-streams are indicated as base layer bit-stream BL and enhancement layer bit-stream EL in FIG. 1. Base layer bit-stream BL is transmitted over ATM network 70 at high-priority, and enhancement layer bit-stream EL is transmitted at low-priority.

In the illustrative embodiment of FIG. 1, spatial sealability is used as the basis for generating base and enhancement layer bit-streams BL and EL from input signal VIDIN. It will be apparent to those skilled in the art that it might be advantageous to use SNR or frequency sealability in some applications of the invention. Base layer bit-stream BL is generated by encoding a low resolution base layer image using any of a number of well known encoding algorithms, for example, the Motion Picture Experts Group Phase 1 standard (MPEG-1) set forth in the International Standards Organization Committee Draft 11172-2 "Coding of Moving Pictures and Associated Audio for Digital Storage Media at up to 1.5 Mbits/s," November 1991. MPEG-1 encodes video using a combination of transform and predictive coding. The base layer is encoded using a constant bit-rate through the use of encoder base layer smoothing buffer 20. Base layer rate controller 30 generates as an input to two-layer video encoder 10, quantization step size $Q_{BL}$ for each macroblock in the base layer in response to an input signal from encoder base layer smoothing buffer 40 that is representative of the fullness of the buffer. As will be appreciated by those skilled in the art, other buffer control algorithms are equally valid. Quantization step size $Q_{BL}$ is the only variable parameter used for encoding the base layer. All other parameters used by the encoding algorithm to encode the base layer are fixed. Advantageously, the constant rate of base layer encoding significantly simplifies the call admission process as a constant rate channel can be allocated to base layer bit-stream BL which is transmitted at high-priority over ATM network 70.

Enhancement layer bit-stream EL is generated by encoding the difference between the original video signal VIDIN, and the unsampled base layer image, where the base layer image is produced by locally decoding base layer bit-stream BL by two-layer video encoder 20. The enhancement layer is encoded at a constant bit-rate through the use of encoder enhancement layer smoothing buffer 40. Enhancement layer rate controller 50 generates as an input to two-layer video encoder 10, quantization step size $Q_{EL}$ for each macroblock in the enhancement layer in response to an input signal from encoder enhancement layer smoothing buffer 40 that is representative of the fullness of the buffer. As will be appreciated by those skilled in the art, other buffer control algorithms are equally valid. Quantization step size $Q_{EL}$ is the first variable encoding parameter used for encoding the enhancement layer. The enhancement layer is also encoded using second and third variable encoding parameters generated by enhancement layer adaptation device 60 in accordance with an aspect of the invention. The second variable encoding parameter is the spatio-temporal weighting parameter, w. The third variable encoding parameter is the number of slice-start synchronization codes inserted within each encoded frame, Nsstrt. The remaining parameters used to encode the enhancement layer are fixed. Spatio-temporal weighting parameter w and slice-start synchronization parameter $N_{strt}$ are generated by enhancement layer adaptation device 60 as an input to two-layer video encoder 10.

Figure 2:
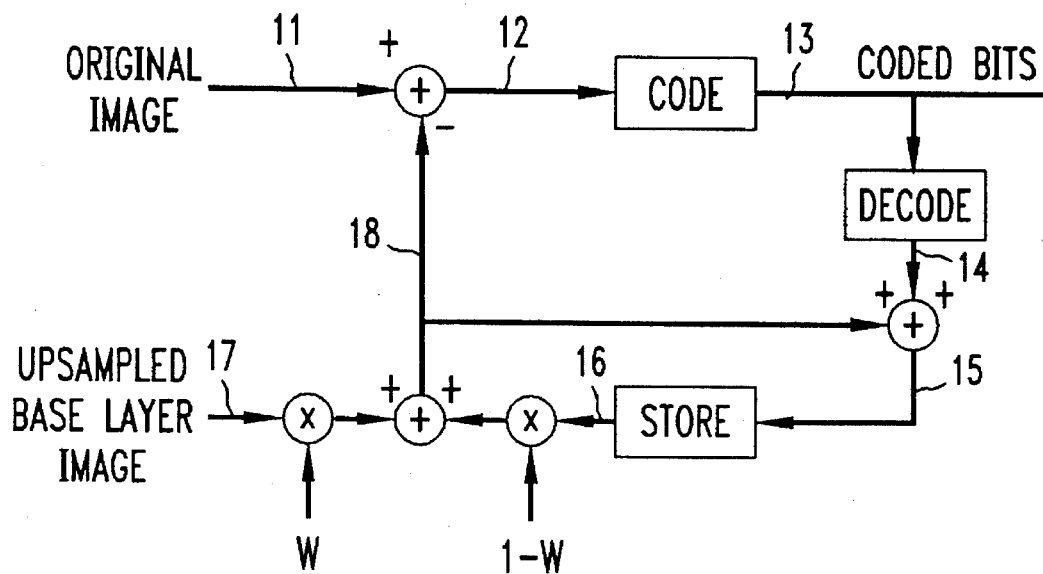
FIG. 2 shows the method of encoding the enhancement layer used in the illustrative embodiment of FIG. 1.

Attention is directed to FIG. 2 which shows the method of encoding the enhancement layer used in the illustrative embodiment of FIG. 1 in accordance with an aspect of this invention. As is disclosed in MPEG-2 TM5 noted above, there is a loose coupling between the base and enhancement layers, that is, the coding algorithms used to code the layers are independent, but the enhancement coding algorithm can make use of the decoded images produced by the base layer algorithm. In FIG. 2, the predicted image on line 18 is subtracted from the original image on line 11 to produce the error image on line 12 which is to be coded onto line 13. The predicted image is obtained from a weighted average of the enhancement layer image from the previous frame and the base layer image from the current frame, where the enhancement layer image is produced after decoding the enhancement layer bit-stream and adding the result to the upsampled base layer image. (As noted above, the base layer image is produced by decoding the base layer bit-stream.) The predicted image is added back to the locally decoded error image to produce an error tree version of the decoded enhancement layer image on line 15. Spatio-temporal weighting parameter w determines whether the enhancement layer encoding algorithm uses spatial prediction from the base layer image in the current frame, temporal prediction from the enhancement layer image from the previous frame, or a combination of both. Spatio-temporal weighting parameter w is generated by enhancement layer adaptation device 60 in encoder unit 15 (FIG. 1), with such generation method described in greater detail below. For all pels in the macroblock, the prediction pel at the same location is determined using:

$$\hat{x} = w^* x_b + (1-w)^* x_e \quad (1)$$

where $\hat{x}$ is the prediction pel, $x_b$ is the pel from the base layer, and $x_e$ is the pel from the enhancement layer. Thus, if spatio-temporal weighting parameter w=0, the prediction block is obtained purely through temporal prediction, while if spatio-temporal weighting parameter w=1, the prediction block is obtained purely through spatial prediction. If spatio-temporal weighting parameter w is a value other than 1 or 0, then the prediction block is obtained through a combination of spatial and temporal prediction.

In the prior art, a typical choice of spatio-temporal weighting parameter w in ATM networks with no cell losses, is the use of the prediction mode, either temporal or spatial, that produces the smallest residual error energy to produce the best compression efficiency (and hence, high image quality, as higher compression means more video data is transmitted per unit time). This will usually result in the encoder using temporal prediction with spatio-temporal weighting parameter w=0. However, any prediction that uses a spatio-temporal weighting parameter w≠1 is not resilient to cell losses, because any lost data in the enhancement layer bit-stream can potentially cause the error to propagate into many subsequent enhancement layer images which degrades the video image quality. Alternatively, spatial only prediction with spatio-temporal weighting parameter w=1, while providing resiliency to cell losses, will not take the maximum advantage of the information previously transmitted and received in a loss free condition, which results in a loss of compression efficiency and a corresponding reduction in video image quality. Thus, choosing a spatio-temporal weighting parameter w according to the prior art, as discussed above, does not allow the encoder to dynamically select between compression efficiency and resilience to cell loss as network conditions change.

In accordance with the invention, however, spatio-temporal weighting parameter w is adapted to varying cell loss levels and ATM network load conditions to provide for high compression and video image quality when the ATM network load is low and cell loss is rare, and improved resilience to cell loss when the ATM network load and the level of cell loss increases. For a given macroblock, spatio-temporal weighting parameter w is determined as a function of the number of lost cells in a recent time interval, and, as a function of the number of frames since the macroblock was last transmitted with spatial-only prediction. Advantageously, the adaptation performed by enhancement layer adaptation device 60 in encoder unit 15 (FIG. 1), in accordance with an aspect of the invention, provides for high video image quality at the remote end even ff it is the only source on the ATM network using the adaptation. In addition, the adaptation does not influence the performance of other sources, either positively or negatively, nor does the network need to know that any adaptation is taking place.

Figure 3:
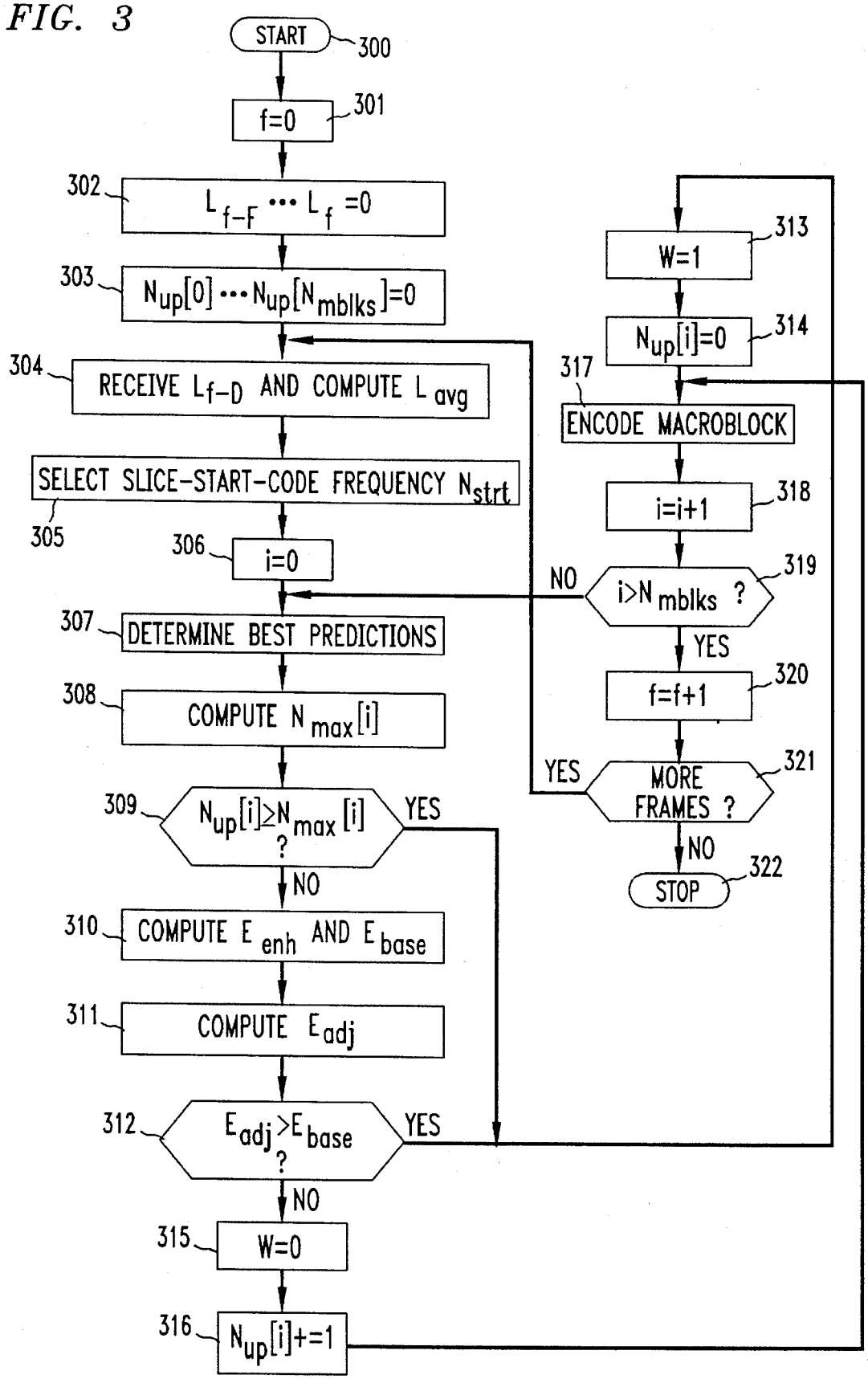
FIG. 3 shows, in flowchart form, the principles behind the determination of the spatio-temporal weighting parameter and slice-start synchronization parameter in accordance with an aspect of the invention.

FIG. 3 shows, in flowchart form, the principles behind the determination of spatio-temporal weighting parameter w performed by enhancement layer adaptation device 60 (FIG. 1). Accordingly, the routine is entered via step 300 upon the arrival of the current frame of original video signal VIDIN at two-layer video encoder 10 (FIG. 1 ). In steps 301 to 303, enhancement layer adaptation device 60 initializes the current frame number, f=0. the previous received losses, $L_{f-F}$ . . . $L_f$=0, and the most recent update of all macroblocks, $N_{up}[0]$ . . . $N_{up}[N_{mblks}]$=0, where $N_{mblks}$ is the number of macroblocks in the frame. In step 304. enhancement layer adaptation device 60 receives the number of cell loss events D frames ago from decoder AAL 75, $L_{f-D}$, where D corresponds to the delay imposed by transmission and buffering, and computes a running average of the number of cell loss events in the last F frames, as:

$$L_{avg} = \left( \sum_{j=f-F}^{f} L_{j-D} \right) / F \qquad (2)$$

As F increases, so does the latency in reacting to changing network conditions. However, if F is too short, enhancement layer adaptation device 60 may be adapting to individual losses rather than to actual network conditions. Although not a limitation on the invention, for purposes of this example, values of F in the range of ten to fifteen have been shown to be effective to allow enhancement layer adaptation device 60 to adapt to average network conditions rather than to individual cell losses. Therefore, in a heavily congested network, enhancement layer adaptation device 60 does not need to wait until it receives information about particular cell losses before it adapts because it has already received information that cell losses will likely occur, and it can adjust its generation of encoding parameters accordingly.

In step 305, enhancement layer adaptation device 60 (FIG. 1) determines how frequently two-layer video encoder 10 (FIG. 1) inserts slice-start synchronization codes in the enhancement layer bit-stream. In this illustrative embodiment, slice-start sychronization codes are evenly distributed throughout the frame, with slice-start synchronization parameter $N_{strt}$ being equal to the number of macroblocks between each slice-start sychronization code determined according to:

$$N_{strt}=Max(2,MIN(1+L_{avg}*3, v)) \qquad (3)$$

where v is number of macroblocks contained vertically in the frame. Accordingly, the minimum number of slices is equal to the number of macroblocks vertically in the frame, while the maximum number is half the total number of macroblocks in the frame. When there are no cell losses on the network, the best video image quality can be obtained when two-layer encoder 10 (FIG. 1) inserts a single slice-start synchronization code per frame as each new slice consumes at least 40 bits of overhead in the enhancement layer bit-stream. However, more slices provides more immunity to error because if two-layer video decoder 90 (FIG. 1) becomes lost in decoding a bit-stream, whether due to a random bit error or lost cell, it can recover by waiting for the next slice-start sychronization code. Therefore, as cell losses on the network increase, the spatial extent of cell losses is reduced and video image quality improved, when a greater number of slice-start synchronization codes are inserted in the low-priority bit-stream according to equation (3).

In step 306, enhancement layer adaptation device 60 initializes the macroblock number i=0 to begin coding the frame. In step 307, enhancement layer adaptation device 60 determines the spatial prediction and the best temporal prediction, using the available enhancement layer images, according to methods known to those skilled in the art, for example, the MPEG-1 video encoding standard noted above.

In step 308, enhancement layer adaptation device 60 computes the maximum number of frames, $N_{max}[i]$ that can elapse before macroblock i is sent using spatial prediction from the base layer image:

$$N_{max}[i]=15-L_{avg}*3-r \qquad (4)$$

where r is a random integer between −2 and 2 inclusive. The random element is incorporated so that all predictions from the base layer image, produced in accordance with equation (4), do not occur in just one frame, but are distributed randomly among several frames.

In step 309, enhancement layer adaptation device 60 compares the two values $N_{up}[i]$ and $N_{max}[i]$. If $N_{up}[i]<M_{max}$

[i], enhancement layer adaptation device 60 will set w=1 in step 313, resulting in two-layer video encoder 10 encoding using spatial only prediction, otherwise it continues with step 310.

In step 310, enhancement layer adaptation device 60 computes the residual energy in the error after the temporal prediction from the enhancement layer image from the previous frame $E_{enh}$ and computes the residual energy of the error after spatial prediction from the current base layer image $E_{base}$. These computations are well known to those skilled in the art and are not discussed in detail here.

In step 311, enhancement layer adaptation device 60 computes an adjusted error, $E_{adj}$:

$$E_{adj} = E_{offset} + E_{enh} * E_{slope} \quad (5)$$

where for purpose of this illustrative embodiment, $$E_{offset} = (N_{up}[i]+1) * L_{avg} * 3 * F \quad (6)$$

and $$E_{slope} = 1 + L_{avg}(N_{up}[i]+1)/4 \quad (7)$$

In step 312, enhancement layer adaptation device 60 (FIG. 1) compares the two values $E_{adj}$ and $E_{base}$. If $E_{adj} > E_{base}$, enhancement layer adaptation device 60 sets w=1 in step 313 so that two-layer video encoder 10 uses only spatial prediction to encode the enhancement layer image, and resets the most recent update of the current macroblock $N_{up}[i]=0$ in step 314. Otherwise, enhancement layer adaptation device 60 sets w=1 in step 315 so that two-layer video encoder 10 uses temporal prediction, and increments the most recent update of the current macroblock $N_{up}[i]+=1$ in step 316. As will be appreciated by those skilled in the art, the use of a more general spatio-temporal weighting parameter w with a value other than 0 or 1 in the foregoing process is readily apparent. For example, the methodology discussed in appendix G. 1 of MPEG-2 TM5, noted above, is appropriately used by the invention in that spatio-temporal weighting parameters may be selected for each field in the enhancement layer image. For example, it is also possible to use a spatio-temporal weighting parameter value w=0.5 for both fields.

Figure 4:
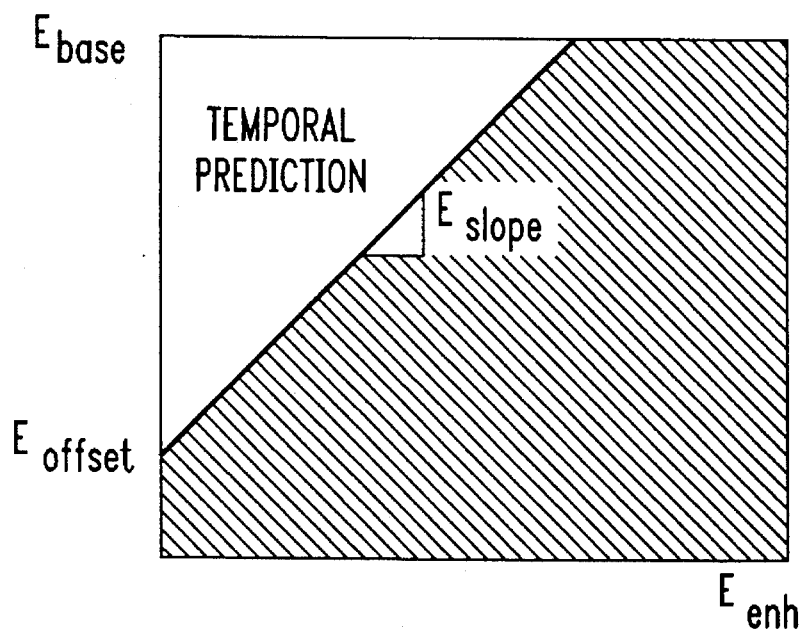
FIG. 4 shows the combinations in residual error energy for which spatial or temporal prediction will be used to encode the enhancement layer used by the illustrative embodiment of FIG. 1.

FIG. 4 is helpful in understanding the operations in steps 311 to 316 in the flowchart shown in FIG. 3. The shaded region in FIG. 4 graphically shows the combinations of $E_{base}$ and $E_{enh}$ for which spatial prediction is used. The unshaded region shows the combination of $E_{base}$ and $E_{enh}$ for which temporal prediction is used. Points on the line dividing the two regions are regarded as belonging to the spatial prediction region. The line dividing the two regions varies as a function of the number of frames since the last spatial prediction for the current macroblock i, and as a function of the average number of lost cells in the last F frames according to the values of $E_{offset}$ and $E_{slope}$ as determined in step 310 in the flowchart shown in FIG. 3. Thus, FIG. 4 shows that the likelihood of using spatial prediction increases when there are many cell losses on the network. In this illustrative embodiment, the value of $E_{offset}$ is determined so that flat areas in the frame are encoded using spatial prediction to gain resiliency to cell loss since the prediction errors in these areas are not so large that much compression efficiency is lost over temporal prediction. The value of $E_{slope}$ is determined such that the slope increases from unity as the number of cell losses in the last F frames increases, or, as the number of frames since the last spatial prediction increases. Accordingly, $E_{offset} 0$ and $E_{stop}=1$ when there have been no cell losses in the last F frames. It will be apparent to those skilled in the art that regions with shapes other than those shown in FIG. 4 may also be advantageous to use in some applications of the invention.

Returning to FIG. 3, in step 317, the current macroblock is encoded by two-layer video encoder 10 (FIG. 1) using the value generated by enhancement layer adaptation device 60 (FIG. 1) in step 313 or 315 for spatio-temporal weighting parameter w. In step 318, the macroblock number i is incremented i+=1. In step 319, the value of the macroblock number i is compared with the number of macroblocks in a frame, $N_{mblks}$. If $i > N_{mblks}$, the process continues by going to step 320. If $i < N_{mblks}$, the process repeats by returning to step 307. In step 320, the frame number f gets incremented f+=1. In step 321, two-layer video encoder 10 determines if there are any more frames from video signal VIDIN to encode. If there are still frames to encode, the process repeats by returning to step 304. If there are no more frames to encode, two-layer video encoder 10 stops encoding in step 321.

Returning to FIG. 1, after original video input signal VIDIN is partitioned and encoded by two-layer encoder 10 as described above, base layer bit-stream BL and enhancement layer bit-stream EL are transmitted as an input to encoder base layer smoothing buffer 20, and encoder enhancement layer smoothing buffer 40, respectively, where the bit-streams are stored in a first-in-first-out basis for output to encoder ATM adaptation layer (AAL) device 65. Encoder AAL device 65 packetizes base layer bit-stream stream BL and enhancement layer bit-stream EL into fixed length cells as bit-streams BLPACK and ELPACK for transmission across ATM network 70. An indication of the fullness of encoder base layer smoothing buffer 20 is received by base layer rate controller 30 for determining quantization step size $Q_{BL}$ for encoding the base layer as described above. Similarly, an indication of the fullness of encoder enhancement layer smoothing buffer 40 is received by enhancement layer rate controller 50 for determining quantization step size $Q_{EL}$ for encoding the enhancement layer. Buffers and AAL devices and the functions employed therein are well known in the art.

At decoder unit 95, decoder AAL device 75 depacketizes packetized base layer bit-stream $BLPACK_R$ and packetized enhancement layer bit-stream $ELPACK_R$ and counts the number of lost cells in each frame of video (with the R subscript denoting that the bit-streams within the decoder unit 95 may contain errors due to cell loss during transmission on ATM network 70). During each frame period, decoder AAL device 75 in decoder unit 95 transmits the number of cell loss events in the frame in bit-stream LOSS to enhancement layer adaptation device 60 across ATM network 70. Enhancement layer adaptation device 60 can thus adapt spatio-temporal weighting parameter w and slice-start sychronization parameter $N_{strt}$ to the cell loss rate on ATM network 70 that is monitored by decoder AAL device 75. Advantageously, bit-stream LOSS consists only of a simple count of lost cells per frame, rather than consisting of the exact location of errored macroblocks, thereby reducing the feedback delay to the two-layer encoder 10. The feedback delay is limited the round trip transmission delay plus the coding buffer delay because the cell losses are detected prior to decoding. Therefore, the time it takes decoder unit 95 to decode the incoming bit-stream is not a factor in the adaptation response time of encoder unit 10.

Decoder AAL device 75 supplies depacketizes base layer bit-stream $BL_R$ and enhancement layer bit-stream $EL_R$ as an input to decoder base layer smoothing buffer 80 and decoder enhancement layer smoothing buffer 85, respectively, where the bit-streams are stored on first-in-first-out basis for output to two-layer video decoder 90 (again, with the R subscript denoting that the bit-streams within decoder unit 95 may contain errors due to cell loss during transmission on ATM network 70). Two-layer video decoder 90 decodes base layer bit-stream $BL_R$ and enhancement layer bit-stream $EL_R$ at a constant bit-rate through the use of decoder base layer smoothing buffer 80 and decoder enhancement layer smoothing buffer 85. Two-layer video decoder supplies as an output video signal VIDOUT, a reconstructed version of original video signal VIDIN. Two-layer video decoders and the techniques employed therein are well known in the art.

The foregoing merely illustrates the principles of the present invention. Although particular applications using the adaptive encoder of the present invention are disclosed, video signals have only been used herein in an exemplary manner, and therefore, the scope of the invention is not limited to the use of video signals. The present invention can be used whenever two-way communication is possible using any signal capable of being divided into units and encoded. For example, other applications include news retrieval services and database browsing. It will be appreciated that those skilled in the art will be able to devise numerous and various alternative arrangements which, although not explicitly shown or described herein, embody the principles of the invention and are within its spirit and scope.

We claim:

1. A method of adapting video encoding parameters used by an encoder to encode an original video signal including frames, each frame containing at least one image representation, as an output for transmission on an ATM network, the method comprising the steps of:

encoding each of said frames into high-priority and low-priority bit-streams;

packetizing said encoded frames into cells and outputting said cells for transmission on said ATM network;

depacketizing said cells to obtain said encoded frames;

monitoring a level of cell loss occurring in each of said encoded frames;

generating a representation of said level of cell loss for each of said encoded frames.

2. The method as defined in claim 1 wherein said step of adapting includes selecting a prediction mode used to encode said low-priority bit-stream in response to said representation of said level of cell loss.

3. The method as defined in claim 1 wherein said step of adapting includes inserting synchronization information into the encoded low-priority bit-stream in response to said representation of said level of cell loss.

4. The method as defined in claim 1 wherein said step of monitoring includes counting a number of cells lost in each of said encoded frames.

5. The method as defined in claim 4 wherein said step of transmitting includes sending said number of cells lost in each of said encoded frames to said encoder.

6. The method as defined in claim 5 wherein said step of adapting includes inserting slice-start synchronization codes into said encoded low-priority bit-stream in response to said representation of said level of cell loss.

7. A method of adapting video encoding parameters to encode an original video signal including frames, each frame containing at least one image representation, as an output for transmission on an ATM network, the method comprising the steps of:

encoding each of said frames into high-priority and low-priority bit-streams; and adapting encoding parameters used to encode said low-priority bit-stream in response to a representation of a level of cell loss on said ATM network, where said adapting is independent of said encoding of said high-priority bit-stream.

8. The method as defined in claim 7 wherein said step of adapting includes selecting a prediction mode used to encode said low-priority bit-stream in response to said representation of said level of cell loss.

9. The method as defined in claim 7 wherein said step of adapting includes inserting synchronization information into said encoded low-priority bit-stream in response to said representation of said level of cell loss.

10. The method as defined in claim 9 wherein said step of adapting includes inserting slice-start synchronization codes into said encoded low-priority bit-stream in response to said representation of said level of cell loss.

11. A method of adapting video encoding parameters used by an encoder to encode an original video signal including frames, each frame containing at least one image representation, into high and low-priority bit-streams as a output for transmission on an ATM network in packetized cells, the method comprising the steps of:

receiving said transmitted packetized cells including said high and low priority bit-streams, where encoding parameters used to encode said low-priority bit-stream are adapted in response to a representation of a level of cell loss on said ATM network and said adaptation is independent of said encoding of said high-priority bit-stream;

depacketizing said transmitted cells to obtain said encoded frames;

monitoring a level of cell loss occurring in each of said encoded frames;

generating a representation of said level of cell loss for each of said encoded frames; and transmitting said representation of said level of cell loss to said encoder on said ATM network.

12. The method as defined in claim 11 wherein said step of monitoring includes counting a number of cells lost in each of said encoded frames.

13. Apparatus for adapting video encoding parameters used by an encoder to encode an original video signal including frames, each frame containing at least one image representation, as an output for transmission on an ATM network, said apparatus comprising:

means for encoding each of said frames into high-priority and low-priority bit-streams;

means for packetizing said encoded frames into cells, said packetizing means outputting said cells for transmission on said ATM network;

means for depacketizing said cells to obtain said encoded frames;

means for monitoring a level of cell loss occurring in each of said encoded frames;

means for generating a representation of said level of cell loss for each of said encoded frames;

means for transmitting said representation of said level of cell loss to said encoder on said ATM network; and means for adapting encoding parameters used to encode said low-priority bit-stream in response to said representation of said level of cell loss, where said means for adapting is independent of said means for encoding said high-priority bit-stream.

14. The apparatus as defined in claim 13 wherein said means for adapting includes means for selecting a prediction mode used to encode said low-priority bit-stream in response to said representation of said level of cell loss.

15. The apparatus as defined in claim 13 wherein said means for adapting includes means for inserting synchronization information into the encoded low-priority bit-stream in response to said representation of said level of cell loss.

16. The apparatus as defined in claim 13 wherein said means for monitoring includes means for counting a number of cells lost in each of said encoded frames.

17. The apparatus as defined in claim 16 wherein said means for transmitting includes means for sending said number of cells lost in each of said encoded frames to said encoder.

18. The apparatus as defined in claim 16 wherein said means for adapting includes means for inserting slice-start synchronization codes into the encoded low-priority bit-stream in response to said representation of said level of cell loss.

19. Apparatus for adapting video encoding parameters to encode an original video signal including frames, each frame containing at least one image representation, as an output for transmission on an ATM network, the apparatus comprising:

means for encoding each of said frames into encoded versions having high-priority and low-priority bit-streams; and means for adapting encoding parameters used to encode said low-priority bit-stream in response to a representation of a level of cell loss on said ATM network, where said means for adapting is independent of said means for encoding said high-priority bit-stream.

20. The apparatus as defined in claim 19 wherein said means for adapting includes means for selecting a prediction mode used to encode said low-priority bit-stream in response to said representation of said level of cell loss.

21. The apparatus as delined in claim 19 wherein said means for adapting includes means for inserting synchronization information into said encoded low-priority bit-stream in response to said representation of said level of cell loss.

22. The method as defined in claim 19 wherein said means for adapting includes inserting slice-start synchronization codes into said encoded low-priority bit-stream in response to said representation of said level of cell loss.

23. Apparatus for adapting video encoding parameters used by an encoder to encode an original video signal including frames, each frame containing at least one image representation, into encoded version having high and low-priority bit-streams as packetized output for transmission on an ATM network in cells, the apparatus comprising:

means for receiving said transmitted cells including said high and low priority bit-streams, where encoding parameters used to encode said low-priority bit-stream are adapted in response to a representation of a level of cell loss on said ATM network and said means for adaptation is independent of said means for encoding said high-priority bit-stream;

means for depacketizing said transmitted cells to obtain said encoded frames;

means for monitoring a level of cell loss occurring in each of said encoded frames;

means for generating a representation of said level of cell loss for each of said encoded frames; and means for transmitting said representation of said level of cell loss to said encoder on said ATM network.

24. The apparatus as defined in claim 23 wherein said means for monitoring includes means for counting a number of cells lost in each of said encoded frames.

* * * * *

UNITED STATES PATENT AND TRADEMARK OFFICE
CERTIFICATE OF CORRECTION

PATENT NO. : 5,515,377
DATED : May 7, 1996
INVENTOR(S) : Caspar Horne, et. al.

It is certified that error appears in the above-indentified patent and that said Letters Patent is hereby corrected as shown below:

In column 9, lines 38,39 change:

"generating a representation of said level of cell loss for each of said encoded frames."

to:

"generating a representation of said level of cell loss for each of said encoded frames;
    transmitting said representation of said level of cell loss to said encoder on said ATM network; and
    adapting encoding parameters used to encode said low-priority bit-stream in response to said representation of said level of cell loss, where said adapting is independent of said encoding of said high-priority bit-stream."

Signed and Sealed this

Twenty-eighth Day of July, 1998

Attest:

BRUCE LEHMAN

Attesting Officer

Commissioner of Patents and Trademarks